Aug. 5, 1958        W. H. TAPLIN III        2,846,483
3,3-DICHLOROPROPENE-1 FROM 1,3-DICHLOROPROPENE
Filed Nov. 19, 1953
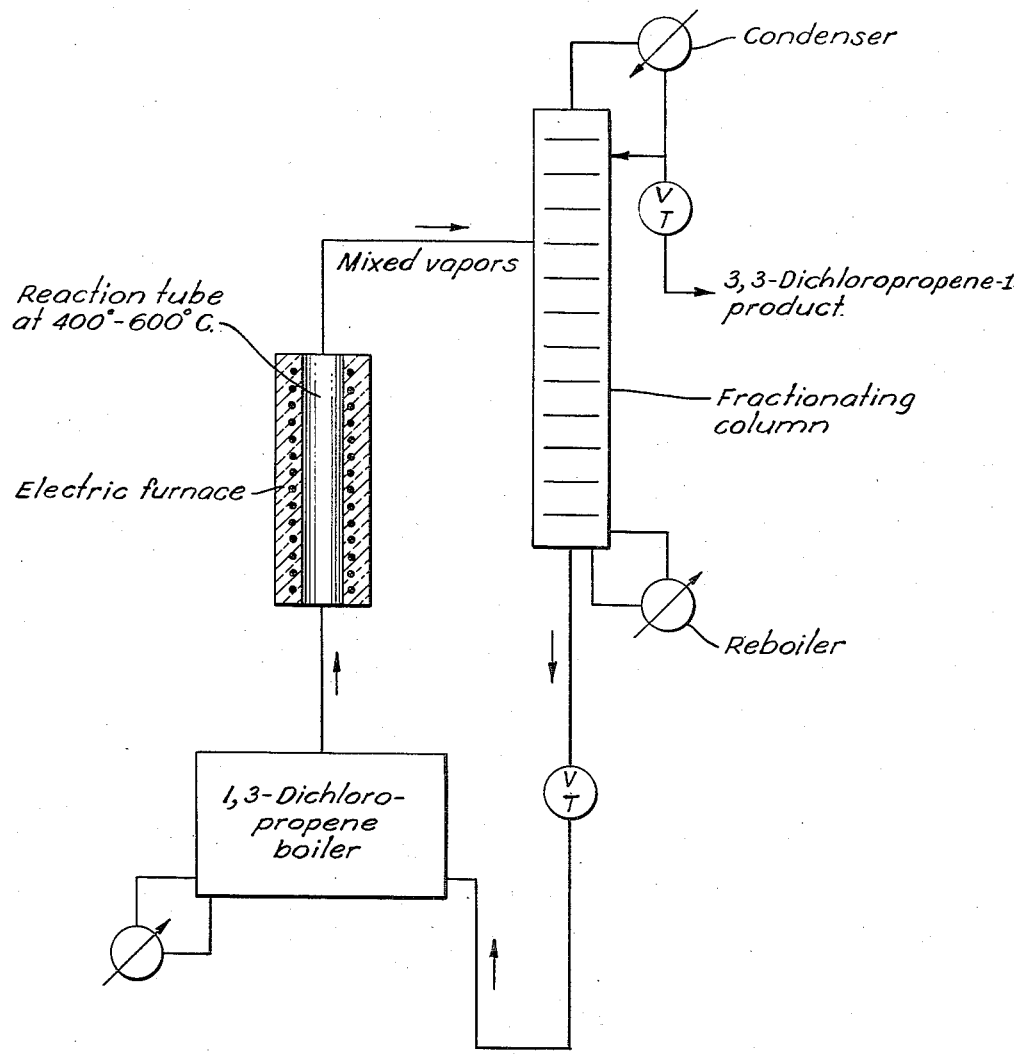
INVENTOR.
William H. Taplin
BY
Griswold & Burdick
ATTORNEYS

2,846,483

3,3-DICHLOROPROPENE-1 FROM 1,3-DICHLOROPROPENE

William H. Taplin III, Concord, Calif., assignor to The Dow Chemical Company, Midland, Mich., a corporation of Delaware Application November 19, 1953, Serial No. 393,171

3 Claims. (Cl. 260—654)

This invention relates to a method for the isomerization of 1,3-dichloropropene to produce 3,3-dichloropropene-1.

The five isomeric dichloropropenes have long been known. The classical sources of these materials are the glycerine derivatives, acrolein and the di- and trichlorohydrins. Hence, until some of the dichloropropenes were obtained by thermal chlorination of $C_3$ hydrocarbons, there was no way of making them in large quantities economically. The commonest dichloropropene obtained by chlorination or by chlorination and pyrolysis of hydrocarbons is 1,3-dichloropropene, whereas the highly desirable product, 3,3-dichloropropene-1, is obtained in negligible amounts from such sources and seldom represents as much as 10 percent of its mixture with 1,3-dichloropropene.

Among the purposes for which a supply of 3,3-dichloropropene-1 is desired are (1) biocidal, especially as a nematocide, and (2) chemical, for such reactions as (a) hydrolysis to form acrolein, (b) alcoholysis to form acetals, and (c) reaction with alkaline sulfides or hydrosulfides to form thioacrolein and related compounds.

It would be especially interesting, and it is the principal object of this invention to find a method for converting the easily produced 1,3-dichloropropene into the 3,3-isomer. The only published comment which has been found, relative to this possibility, is wholly unfavorable. Thus, George W. Hearne, an expert in the field of allylic chlorides, has reported that the formation of 1,3-dichloropropene from 3,3-dichloropropene-1 is conceivable, but the reverse of this rearrangement is very unlikely. ("The Vortex," Bulletin of the California Section, American Chemical Society, vol. IX, No. 8, October 1948, pages 412–421, at page 416.)

The method of the present invention consists essentially in passing the vapor of 1,3-dichloropropene through a tube or vessel heated to from 400° to 600° C. at such a rate as to provide a residence time in the heated zone of from 1 to 30 seconds, at least partially condensing the effluent vapors from said zone, and fractionating the condensate. Unchanged 1,3-dichloropropene, boiling at about 106° C., is returned to the boiler to be recycled through the isomerization chamber, while 3,3-dichloropropene-1, boiling at about 84° C., is recovered as the product of the treatment. The accompanying drawing is a diagram of suitable apparatus for use in carrying out the new method. The amount of 1,3-dichloropropene which is converted to 3,3-dichloropropene-1 in each pass through the heated zone is from 0.3 to 8 percent, increasing both with the temperature and the residence time in the heated zone. Short residence times, of the order of 1 second, give low conversions, even at 600° C., while residence times in the heated zone of the order of 10 seconds give significantly increasing conversions with small temperature changes. This may be shown in the following table, wherein approximate proportions of 3,3-dichloropropene-1 in the effluent stream are reported for each of several reaction conditions. In the reported tests, the vapors were assumed to be at the indicated temperature all the time they were in the heated zone. In the equipment used, the time at reaction temperature was somewhat less than is shown in the table. In apparatus with large contact area relative to gas volume, somewhat higher conversions to 3,3-dichloropropene-1 can be expected at each temperature than were found in these runs.

TABLE

*Approximate percent conversion, per pass, to 3,3-dichloropropene-1*

| Temperature of heated zone, ° C. | Residence time in heated zone | | | | |
|---|---|---|---|---|---|
| | 1 sec. | 4 sec. | 7 sec. | 10 sec. | 15 sec. |
| 300 | 0.15 | | | 0.2 | |
| 350 | 0.2 | | | 0.33 | |
| 400 | 0.3 | | | 0.7 | |
| 450 | 0.35 | | | 1.6 | |
| 475 | 0.4 | 1.1 | 1.7 | 2.3 | 3.3 |
| 500 | 0.45 | | | 3.3 | |
| 525 | | 2.0 | 3.6 | 5.4 | 8.0 |
| 550 | 0.5 | | | 6.5 | |
| 575 | | | | 7.5 | |
| 600 | 0.6 | | | | |

The preferred operating conditions call for exposure of the dichloropropene vapors to temperatures from 450° to 575° C. for periods of from 3 to 12 seconds.

The following example illustrates the practice of the invention.

EXAMPLE 1

In an apparatus similar to that shown in the accompanying diagram, and in which the vapors were preheated to about 400° C. before entering the furnace, the heated zone through which the vapors of dichloropropenes were passed had a volume of 800 milliliters. This zone was maintained at 485° C., and 1,3-dichloropropene vapor was supplied thereto at a rate of about 480 grams, or 4.32 mols per hour. Hence, the average residence time in the heated zone was near 11 seconds (assuming the applicability of the gas laws to the vapor volume). From time to time, samples were taken of the vapor leaving the heated zone. Analysis showed this effluent product to consist of from 6 to 6.3 percent 3,3-dichloropropene-1, about 10.8 percent cis-1,3-dichloropropene and about 82.9 percent trans-1,3-dichloropropene. The same feed rate and temperature conditions were maintained for 21.5 hours, during which time there was condensed from the vapors taken overhead from the rectifying column 564 milliliters, or about 660 grams of 3,3-dichloropropene-1. This represents an average production of 30.7 grams of the desired product per hour, so that about 6.3 percent of the 1,3-dichloropropene was converted to 3,3-dichloropropene-1 in each pass through the heated zone. The unchanged 1,3-dichloropropene drawn off the bottom of the fractionating tower was returned continuously to the boiler and recycled through the 485° C. isomerization chamber. The conversion to 3,3-dichloropropene-1 realized in the run is somewhat higher than would have been expected from the foregoing table, and this is believed to be the result of having the vapors at reaction temperature for a time much closer to the calculated period of time than in the runs reported in the table.

I claim:

1. The method which consists essentially in exposing 1,3-dichloropropene vapors to a temperature from about 400° to about 600° C. for a period of from 1 to 30 seconds, fractionating the resulting product to recover 3,3-dichloropropene-1, and recycling the unchanged 1,3-dichloropropene through the 400°–600° C. zone to effect further isomerization to 3,3-dichloropropene-1.

2. The method claimed in claim 1, wherein the vapors are exposed to the said temperature for from 3 to 12 seconds.

3. The method claimed in claim 2, wherein the vapors are exposed to a temperature in the range from 450° to 575° C.

References Cited in the file of this patent

UNITED STATES PATENTS 2,446,475     Hearne et al. _____ Aug. 3, 1948

OTHER REFERENCES

Huntress: "Organic Chlorine Compounds," pages 604–5 (1948).

Hearne: "The Vortex," vol. IX, No. 8, pages 412–421 (1948).